United States Patent [19]

Hamilton et al.

[11] 4,387,560

[45] Jun. 14, 1983

[54] UTILIZATION OF COAL IN A COMBINED CYCLE POWERPLANT

[75] Inventors: Stuart Hamilton, Glastonbury; John J. Horgan, Wethersfield, both of Conn.

[73] Assignee: United Technologies Corporation, Hartford, Conn.

[21] Appl. No.: 220,541

[22] Filed: Dec. 29, 1980

[51] Int. Cl.³ .......................... F02C 3/28; F02C 7/08
[52] U.S. Cl. ................................ 60/39.02; 60/39.12; 60/39.182
[58] Field of Search ............. 60/39.02, 39.12, 39.18 B, 60/39.46 S, 39.51 R

[56] References Cited

U.S. PATENT DOCUMENTS

| | | | |
|---|---|---|---|
| 3,446,014 | 5/1969 | Foster-Pegg | 60/39.02 |
| 3,847,563 | 11/1974 | Archer et al. | 48/77 |
| 3,978,657 | 9/1976 | Fulton et al. | 60/39.12 |
| 4,253,300 | 3/1981 | Willyoung | 60/39.46 S |

OTHER PUBLICATIONS

Marks & Baumeister, *Mechanical Engineers' Handbook*, McGraw-Hill, Inc., New York, 1958, pp. 7-4-7-6.

*Primary Examiner*—Louis J. Casaregola
*Attorney, Agent, or Firm*—Gene D. Fleischhauer

[57] ABSTRACT

A combined powerplant 10 employing a gas turbine engine cycle 12 and a steam turbine engine cycle 14 is disclosed. The powerplant includes a partial gasifier 22 and an auxiliary combustor 20. The powerplant utilizes the heating value of coal in a two-stage combustion process by burning the gases derived from the coal within the gas turbine engine and by burning the char derived from the coal externally of the engine in the auxiliary combustor. Heat is transferred from the auxiliary combustor to the respective working mediums of both engines.

4 Claims, 6 Drawing Figures

UTILIZATION OF COAL IN A COMBINED CYCLE POWERPLANT

DESCRIPTION

1. Technical Field

This invention relates to the combustion of coal and particularly to the use of coal-derived fuels with a combined cycle powerplant.

2. Background Art

Coal is an attractive source of energy because coal reserves are substantially larger than those of oil and natural gas. Traditionally, energy is obtained from the coal by burning the coal directly in a furnace to form high temperature gases. Energy in the form of heat is transferred from the high temperature gases and may be transformed into work by raising and passing steam through a steam turbine. The steam engine may be used alone or in conjunction with a gas turbine engine cycle to form a combined cycle.

In gas turbine engines, hot working medium gases are expanded through a turbine to produce work. One approach to using coal as a source of energy in a gas turbine engine is to first pulverize the coal and to subsequently burn the coal in a combustion chamber of the engine to form the hot working medium gases. Burning coal directly in the engine produces ash and these ash particulates cause damage to the engine as they pass through the engine degrading the service life and the performance of the engine. A second approach to using coal is to first process the coal to obtain combustible gases or liquids. The combustible fluids, either gases or liquids, are cleaned of ash and pollutants and are then burned in the gas turbine engine to produce the hot working medium gases.

Some gasification processes for producing combustible gses also form a carbon rich by-product called char. The char is normally recycled until all of the carbon is gasified. Burning the char directly in the gas turbine engine would improve the gasifier output and cycle efficiency, but, as is the case with pulverized coal, burning the char produces abrasive particulates which may damage the turbine. Accordingly, scientists and engineers are seeking ways to utilize the full heating value of coal in a combined cycle without exposing the gas turbine engine components to abrasive particulates.

DISCLOSURE OF INVENTION

According to the present invention, a combined cycle powerplant employing a gas turbine engine cycle and steam turbine engine cycle utilizes the heating value of coal in a two-stage combustion process by burning the gases derived from the coal within the gas turbine engine and by burning the char derived from the coal externally of the engines in an auxiliary combustor and transferring heat to the respective working mediums of both engines.

In accordance with one detailed embodiment, the exhaust gases from the turbine fluidize char and limestone in the auxiliary combustor and supply both heat and oxygen to the auxiliary combustor for the burning of the char; two heat exchangers in the auxiliary combustor respectively heat the working medium gases of the gas turbine engine and the steam of the steam turbine engine.

A primary feature of the present invention is an auxiliary combustor. Other features are a gas turbine engine, a steam turbine engine, and a coal gasifier. Coal is fed into the gasifier to produce combustible char and combustible volatile gases. The combustible gases and the combustible char derived from the coal in the gasifier are burned respectively in the gas turbine engine and the auxiliary combustor. The combustible char is burned in the auxiliary combustor with the hot exhaust gases from the turbine to preheat the working medium gases upstream of the engine combustion chamber and to heat the steam entering the steam turbine. The working medium gases are flowed from the compressor of the gas turbine engine through a heat exchanger in the auxiliary combustor and returned to the engine combustion chamber. Working medium fluid is flowed from the condensor of the steam turbine engine through a heat exchanger in the auxiliary combustor and returned to the steam turbine. The auxiliary combustor collaterally supplies heat to the gasifier for high temperature conversion of the coal to combustible gases and char.

A principal advantage of the present invention is the complete utilization of the heating value of the coal in powering a gas turbine engine which results from the on-site combustion of combustible gases and combustible char. The efficiency of the combined cycle is increased by the auxiliary combustor which enables flowing a portion of the heating value of the coal in volatile form to the gas turbine engine and flowing the remainder of the heating value as char to the auxiliary combustor where the heating value is transferred to the gas turbine engine and the steam turbine engine. The efficiency of the gasifier is enhanced by transferring a portion of the heat to the working medium gases from the auxiliary combustor and then recapturing that heat in the auxiliary combustor during combustion of the char. The efficiency of the apparatus is further enhanced by transferring a portion of the heat from the auxiliary combustor to the partial gasifier for conversion of the coal into combustible gases and combustible char. In one embodiment where a fluidized bed is used for the auxiliary combustor the bed is fluidized by the exhaust gases from the gas turbine engine. In one embodiment, the coal conversion means is enabled to produce a medium BTU gas having up to 500 British Thermal Units per cubic foot (500 Btu/ft$^3$).

The foregoing features and advantages of the present invention will become more apparent in the light of the following detailed description of the preferred embodiment thereof as shown in the accompanying drawing.

BEST MODE FOR CARRYING OUT THE INVENTION

Figure 1:
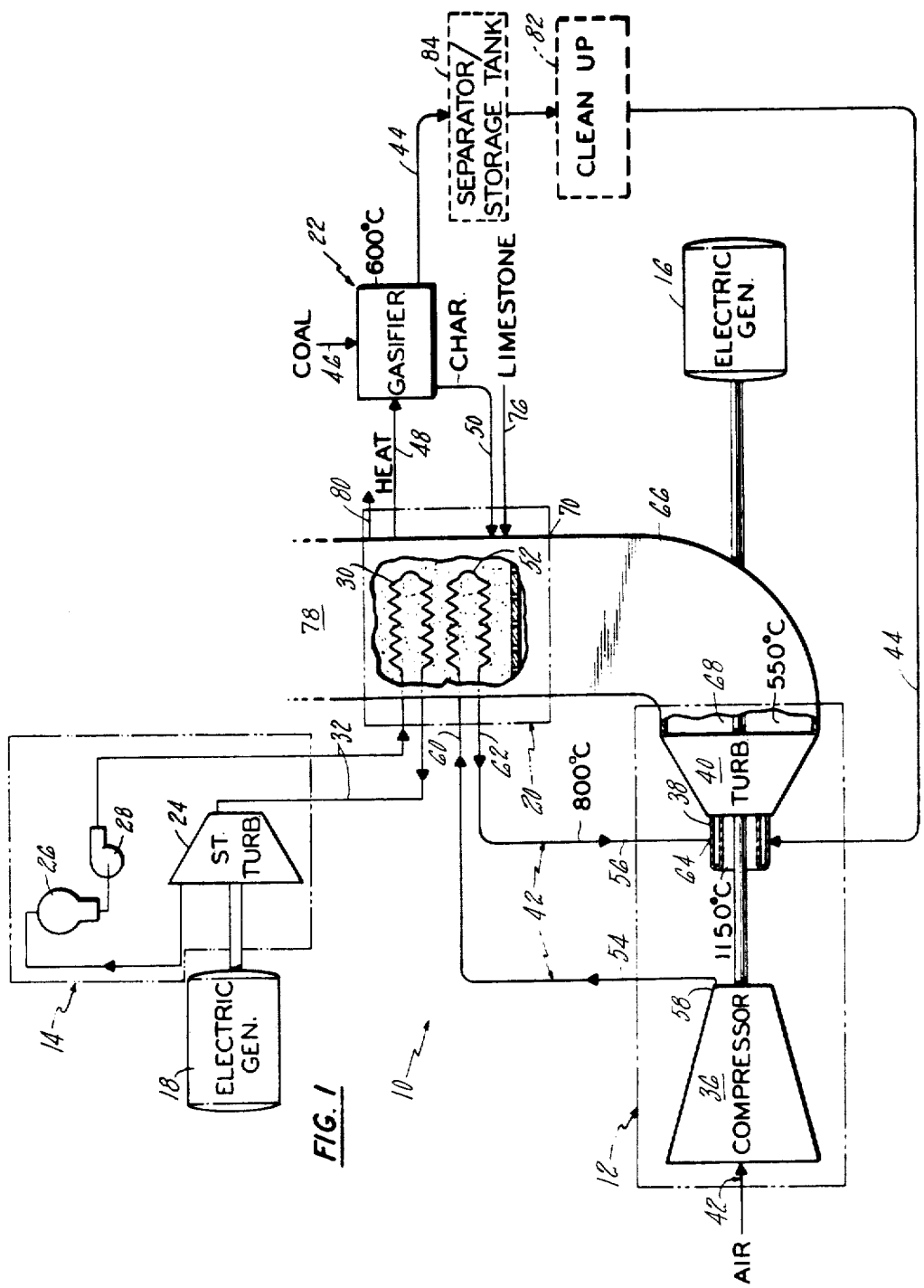
FIG. 1 is a schematic diagram of a coal-fired apparatus employing a gas turbine engine cycle and a steam turbine engine cycle.

FIG. 1 is a schematic diagram of a combined gas turbine and steam turbine engine cycle apparatus 10 employing the combustion of coal in powering the engines. The particular embodiment shown is designed to operate at temperatures which are noted in the schematic although other embodiments of this invention may operate at other temperatures as appropriate. The apparatus includes a gas turbine engine 12 and a steam turbine engine 14. An electrical generator 16 is mechanically coupled to the gas turbine engine. An electrical generator 18 is mechanically coupled to the steam turbine engine. The apparatus further includes an auxiliary combustor such as the fluidized bed combustor 20 and a coal conversion means such as the partial gasifier 22. Each of these devices is well known in the art and each is discussed at length in the publication entitled "Clean Fuels from Coal-Symposium 2", available from the Institute of Gas Technology, Chicago, Ill.

The steam turbine engine 14 includes components such as a steam turbine 24, a condenser 26, a pump 28 and a waste heat boiler 30. A flow path 32 for a working medium fluid extends through these components and is in fluid communication with the components. The boiler is disposed in the auxiliary combustor 20. The boiler is in heat transfer communication with the auxiliary combustor and with gases passing through the auxiliary combustor such as the effluent of the gas turbine engine 12.

The gas turbine engine 12 includes a compressor section 36, a combustion section such as an annular combustion chamber 38 and a turbine section 40. A working medium flow path 42 extends through these sections. A conduit 44 extending into the annular combustion chamber of the gas turbine engine places the working medium flow path of the engine in fluid communication with the partial gasifier 22.

The partial gasifier 22 receives coal from the transfer device 46. The partial gasifier uses heat and partial combustion to extract from the coal combustible fluids for the gas turbine engine 12 and char for the auxiliary combustor 20. A conduit 48 for transferring heat extends from the auxiliary combustor to the partial gasifier. A transfer device 50 for transferring char extends between the partial gasifier and the auxiliary combustor 20.

A heat exchanger 52 is disposed in the auxiliary combustor 20. The heat exchanger is in heat transfer communication with the auxiliary combustor. A portion of the working medium flow path of the gas turbine engine extends through the heat exchanger via conduit 54, and conduit 56. These conduits bound a portion of the working medium flow path 42 of the gas turbine engine. The conduit 54 is in fluid communication with the outlet 58 of the compressor and the inlet 60 of the heat exchanger. The conduit 56 is in fluid communication with the outlet 62 of the heat exchanger and the inlet 64 of the combustion chamber. A conduit 66 for gas turbine effluent extends between the outlet 68 of the gas turbine engine and the inlet 70 of the fluidized bed.

Figure 2:
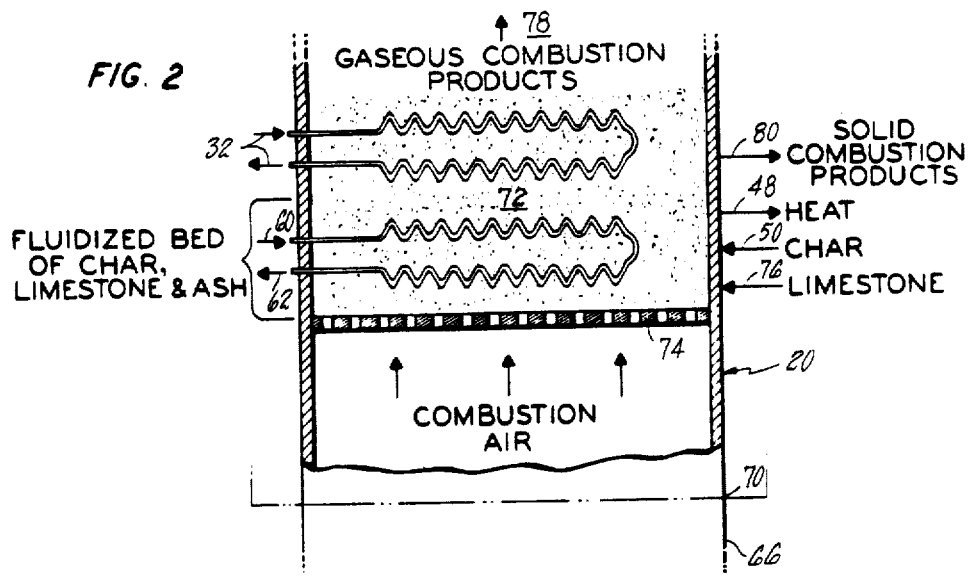
FIG. 2 is a schematic diagram of a fluidized bed combustor.

FIG. 2 is a schematic view of the fluidized bed combustor 20. The bed has a cavity 72. A means for metering flow such as a metering aperture plate 74 is disposed between the inlet 70 and the cavity 72. The cavity receives char from the transfer device 50 and limestone from a transfer device 76. The bed has an outlet 78 for the gaseous products of combustion and a transfer device 80 for removing the nongaseous products of combustion.

During operation of the coal fired gas turbine apparatus, coal is fed into the partial gasifier 22. The gasifier is operated at a preselected distillation temperature to produce char and fluids (gas) in the correct proportions. As an example, a distillation temperature of approximately six hundred degrees Centigrade (600° C.) causes the production of a volatile gas having a heating value in excess of five hundred British Thermal Units per standard cubic foot (H.V. > 500 Btu/scf). For a typical low volatile sub-bituminous coal, distillation at six hundred degrees Centigrade (600° C.) yields the following approximate percentages by weight: char sixty three percent (63%); water ten and three tenths percent (10.3%); dry tar nine and five tenths percent (9.5%); light oil one and six tenths percent (1.6%); gas fifteen percent (15%); and hydrogen sulfide eight tenths of one percent (0.8%).

The char produced during gasification is transferred by the transfer device 50 to the fluidized bed combustor 20 and is burned with oxygen in the exhaust gases from the gas turbine engine 12 to form a high temperature gas. Heat is transferred from the high temperature gas of the fluidized bed via the conduit 48 to the partial gasifier for converting coal into combustible fluids and a combustible char. The combustible fluids in gaseous form include combustibles ($CH_4$, $CO$ and $H_2$), inerts ($N_2$ and $CO_2$) and pollutants ($H_2S$, $NH_3$, H3, tar and dust). These pollutants may be removed from the gas before the gas is flowed to the combustion chamber of the gas turbine engine. For example, a cleanup system 82 such as a Rectisol ® or Purisol ® system using a chemical purification process to remove sulfur compounds and particulates might be employed. Tars and light oil may also be removed from the combustible fluids and stored in a separator/storage tank 84 for later consumption in the gas turbine engine or may be used to promote combustion in the auxiliary combustor by being burned with the combustible char. The combustible fluids produced are flowed through conduit 44 from the partial gasifier to the gas turbine engine 12 to power the engine.

During operation of the gas turbine engine a working medium gas such as air containing oxygen is introduced into the compressor 36. The working medium gas is compressed by the compressor raising the temperature and the pressure of the working medium gas. The working medium gas is flowed from the outlet 58 of the compressor through the conduit 54 to the heat exchanger 52. The working medium gas is introduced into the inlet 60 of the heat exchanger 52 which is disposed in the fluidized bed combustor 70. As the working medium gas is flowed through the heat exchanger the gas receives heat from the heat exchanger increasing the temperature of the gas to a value as high as eight hundred degrees Centigrade (800° C.). Although higher temperatures may be desired from a cycle efficiency standpoint, such higher gas temperatures would exceed the temperature limitations of the materials from which present day turbine and heat exchanger components are manufactured. As better materials become commercially available, the components may be operated at high gas temperatures. The working medium gas is flowed from the outlet 62 of the heat exchanger via conduit 56. The gas is introduced into the inlet of the combustion chamber 64. Combustible fluids from the partial gasifier 22 are introduced into the combustion chamber via the conduit 44. The combustible fluids are burned with the hot working medium gases to increase the temperature of the working medium gases to above eleven hundred fifty degrees Centigrade (1150° C.). These hot working medium gases are introduced into the turbine 40. The gases are expanded through the turbine doing work on the turbine. The mechanical couplings between the turbine and the compressor and between the turbine and the electrical generator enable the turbine to drive these devices.

The pressurized effluent or exhaust from the turbine is flowed via the conduit 66 to the inlet to the fluidized bed 70. The effluent is introduced into the cavity 72 of the fluidized bed through the metering plate 74. Because the pressurized effluent passes rapidly through the bed, the effluent fluidizes the bed to promote the combustion reaction. This pressurized effluent contains unconsumed oxygen and provides combustion oxygen to the fluidized bed. The combustion oxygen is consumed with the char and limestone by burning to produce a high temperature gas which includes the products of combustion. The gas contains essentially all of the heating value of all of the char formed in the partial gasifier. A first portion of the heat in the high temperature gas is transferred via the heat exchanger 52 to the working medium gas of the gas turbine engine to raise the temperature of the working medium gas. A second portion of the heat in the high temperature gas is transferred via the boiler 30 to the working medium fluid of the steam turbine engine to raise steam. The steam is expanded through the steam turbine 24 to power the steam turbine engine. A third portion of the heat in the high temperature gas is transferred via the conduit 48 to the partial gasifier 22. The products of combustion include gaseous matter such as flue gas and nongaseous matter such as ash. The nongaseous products of combustion are removed by the transfer device 78. The gaseous combustion products are flowed from the fluidized bed through the outlet 80.

For each particular coal and for a gas turbine engine operating at a particular combustor exit temperature (turbine inlet temperature), it is desirable to produce combustible fluids and solids in a proportion that optimizes the efficiency of the combined cycle. The efficiency of the combined cycle is a function of the efficiency of the steam turbine engine and of the efficiency of the partial gasifier.

Each gasifier has losses which are generally attributable to pumping and heat losses associated with the volume flow of the fuel gas to the gas turbine engine. The fuel gas volumes required in partial gasification systems are much less than for comparable full gasification systems which suggest that lower losses and higher gasification efficiencies must occur for some operating points as compared to others. One way to quantify the gasifier efficiency is to express as a ratio the quantity of the heating value produced as combustible fluids and combustible char to the quantity of the heating value contained in the coal introduced into the partial gasifier.

Figure 3:
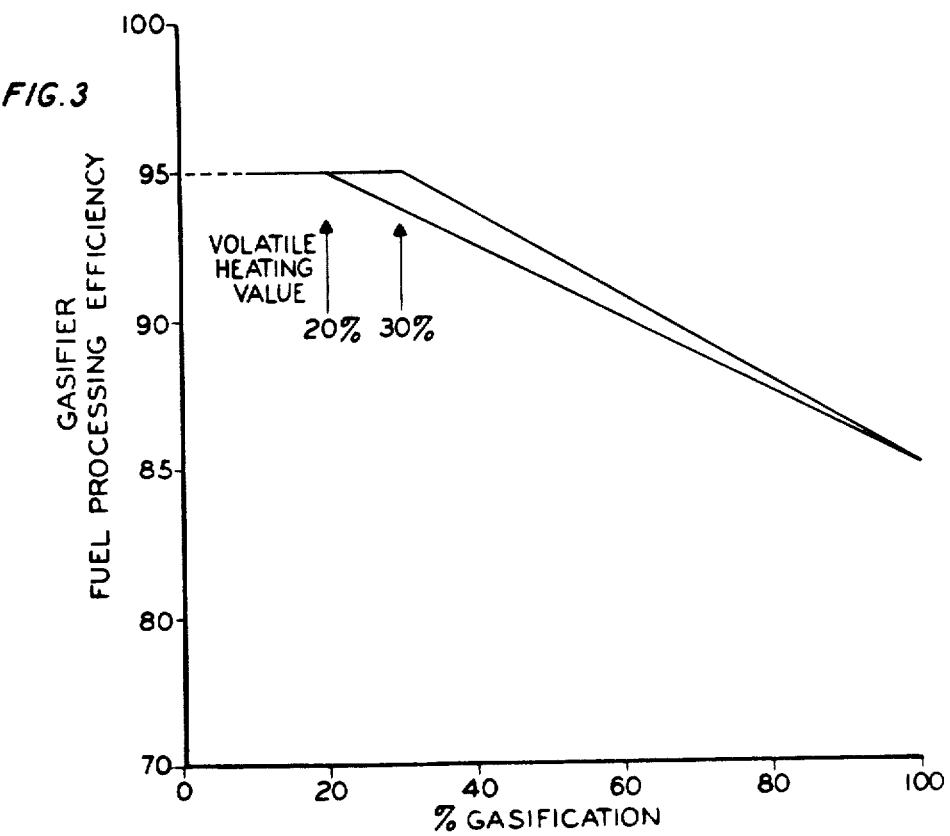
FIG. 3 is a graphical representation of gasifier fuel processing efficiency versus the percentage of coal which is gasified.

FIG. 3 is a good approximation of the efficiencies associated with operating a gasifier at different percentages of gasification. For example, the gasifier efficiency is approximately ninety five percent (95%) during gasification in the absence of uncombined free oxygen. Combustible fluids and combustible char are produced. Assuming the coal contains twenty percent (20%) volatiles (FIG. 3, curve A), the efficiency of the gasifier begins to decrease at twenty percent (20%) gasification as oxygen is added to obtain gasification of the remaining coal. The additional gasification causes the volume flow of gas to increase, decreasing the formation of char. As more oxygen is addd, the volume of the gas flow increases and the efficiency of the gasifier is reduced until the gasifier reaches full gasification operating at eighty five percent (85%) efficiency. At this point, only fluid (gaseous) combustibles are produced. No char is formed and all the heating value is present in the gaseous combustibles.

The inefficiency associated with full gasification results from the required use of a cleanup system 82 to meet air pollution standards as well as to avoid the particulate-caused damage to the gas turbine. The only available cleanup systems are based on chemical processes that work at low temperatures. Cooling the large volume of gases to low temperatures for cleanup may be accomplished by transferring heat into the steam system of the combined cycle. Even then the efficiency of the steam portion of the cycle is less than the combined cycle efficiency causing a decrease in the efficiency of the combined cycle.

The problem is agravated by using air to supply the oxygen. Dry air by volume percent is approximately seventy eight percent (78%) nitrogen and only twenty one percent (21%) oxygen. Accordingly, the volume flows are increased as inert nitrogen is pumped through the system. If pure oxygen is used instead of air, the heat and pumping losses associated with cleaning the combustible fluids in conduit 44 is reduced, but these losses are more than offset by the work required to produce oxygen.

For coal having thirty percent (30%) volatiles, the gasifier efficiency will remain high until those volatiles are driven off (FIG. 3, curve B). At that point, increased volume flow caused by the presence of inert gas causes the gasifier efficiency to begin to decrease. Again an efficiency of eighty five percent (85%) represents the efficiency associated with complete fuel gasification. A review of the literature concerning different gasification cycles indicates that the graphical representation of efficiencies shown in FIG. 3 is conservative for pyrolysis, zero to thirty percent (0-30%) gasification, and optimistic for one hundred percent (100%) gasification. The curve of FIG. 3 suggests that operating the partial gasifier as close as possible to the percent of gasification associated with driving off all the volatiles from the coal will produce the highest gasifier efficiency.

Figure 4:
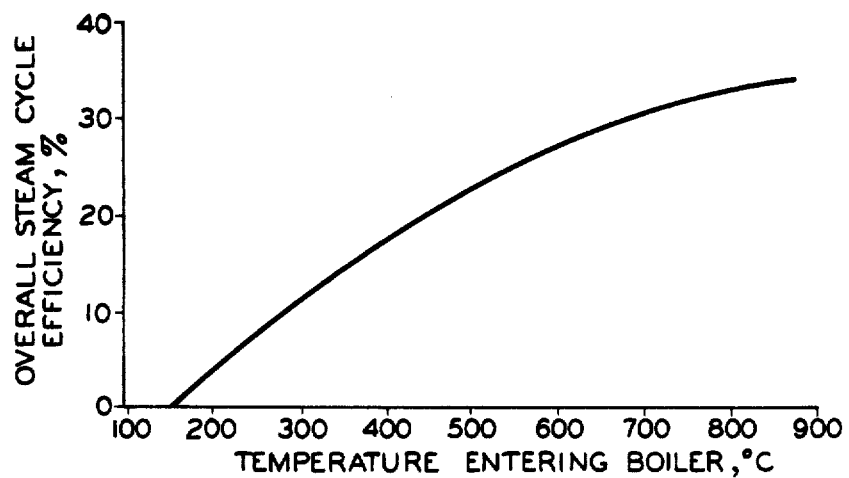
FIG. 4 is a graphical representation of an overall steam cycle efficiency versus the temperature of the working medium fluid entering the boiler of an exemplary steam engine.

The overall efficiency of the steam engine cycle is a function of the temperature of the working medium fluid entering the boiler. A graphical representation of an efficiency curve of an exemplary steam turbine engine cycle is shown in FIG. 4. This particular cycle operates at a condenser pressure of seventy-six and two tenths millimeters of mercury (76.2 mm. Hg.), ten percent (10%) moisture and a stack temperature of one hundred and fifty degrees Centigrade (150° C.). The overall efficiency of the cycle increases with temperature over the temperature range shown. Burning an additional amount of char in the auxiliary combustor to supplementary fire the boiler raises the cycle temperature and increases the efficiency of the steam cycle. A second advantage results from burning this additional amount of char. An additional amount of coal is required to supply the char bringing into the partial gasifier an additioanl portion of the coal which is easily volatilized. An equivalent portion of the coal which is not easily volatilized is then sent to the auxiliary combustor. Substituting the volatile portion of the coal for the not easily volatilized (high mass flow) portion of the coal increases the efficiency of the partial gasifier. Moreover, by burning char in the auxiliary combustor and transferring heat to the gas turbine engine via the heat exchanger in the auxiliary combustor, a further amount of the nonvolatile portion of the coal is burned in the auxiliary combustor decreasing the gas produced in proportion to this increase in the consumption of char.

Figure 5:
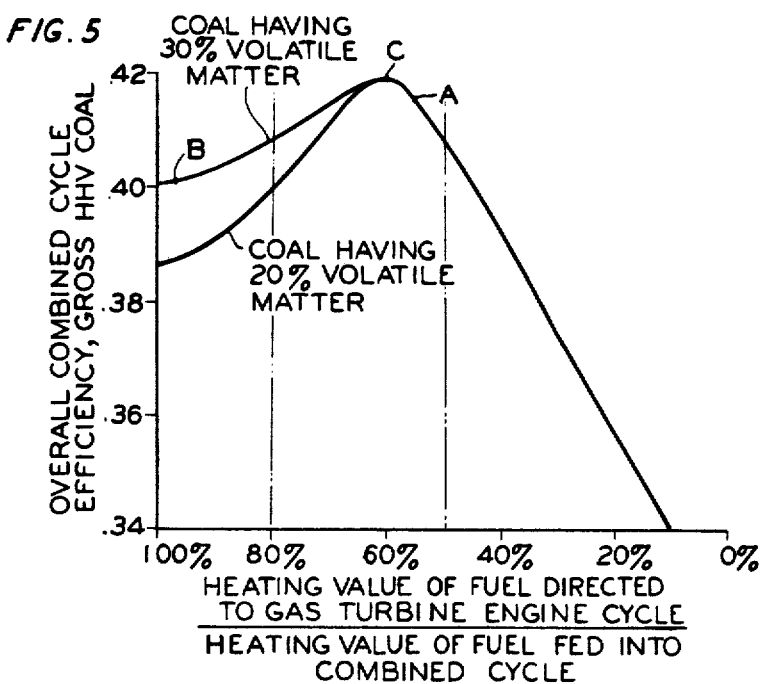
FIG. 5 is a graphical representation of overall combined cycle efficiency versus the percentage of the heating value of the fuel fed into the combined cycle which is directed to gas turbine engine operating at a turbine inlet temperature of one thousand degrees Centigrade (1000° C.)
Figure 6:
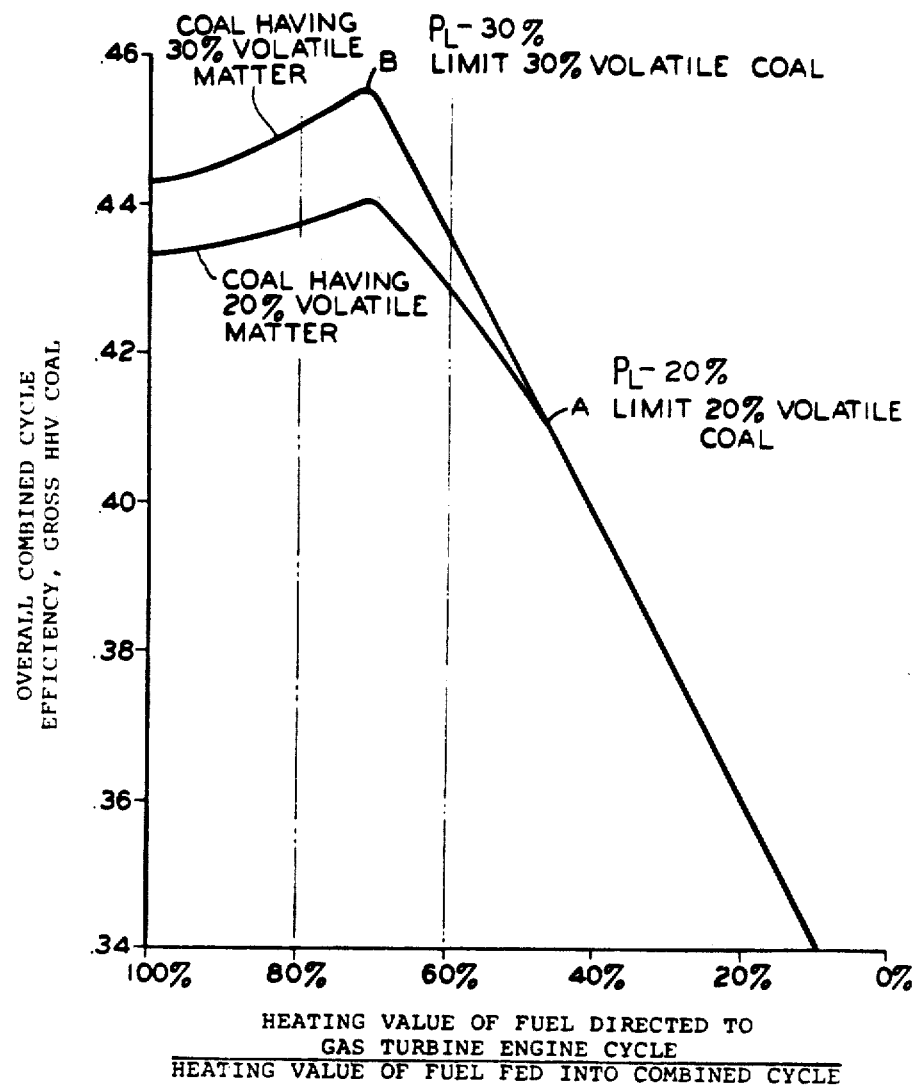
FIG. 6 is a graphical representation of overall combined cycle efficiency versus the percentage of the heating value of the fuel fed into the combined cycle which is directed to gas turbine engine operating at a turbine inlet temperature of eleven hundred and fifty degrees Centigrade (1150° C.).

The overall efficiencies of two representative combined cycles are shown respectively in FIG. 5 and in FIG. 6. In both cycles, the operating temperature of the heat exchanger 52 is limited by establishing a temperature entering the heat exchanger of eight hundred degrees Centigrade (800° C.). FIG. 5 is a graphical representation of the overall efficiency of the combined cycle shown in FIG. 1 based on the gross higher heating value of the coal fed into the partial gasifier versus the amount of heating value of fuel used in the gas turbine engine as a percent of the total amount of heating value of fuel used in the combined cycle. The amount of heating value of fuel sent to the gas turbine engine via the gas from the partial gasifier and via the char to the auxiliary combustor is enough to maintain a turbine inlet temperature of approximately one thousand degrees Centigrade (1000° C.). At every point along the horizontal axis of FIG. 5, that amount of fuel is constant but that amount of fuel decreases as a percentage of the total amount of fuel used in the combined cycle as additional fuel is consumed in the auxiliary combustor to supplementary fire the steam turbine cycle and to provide heat to the partial gasifier. Point A on FIG. 5 marks the operating point where, for coal containing twenty percent (20%) volatile matter, all of the volatile matter in the coal has been gasified and an additional portion of coal not containing volatile matter must be gasified to provide an amount of gas flowing to the gas turbine engine consistent with a turbine inlet temperature of one thousand degrees Centrigrade (1000° C.) and consistent with a maximum temperature of eight hundred degrees Centigrade (800° C.) in the heat exchanger of the auxiliary combustor. Point B on FIG. 5 marks the operating point where, for coal containing thirty percent (30%) volatile matter, all of the volatile matter in the coal is gasified. As can be seen, enough heating value of the coal is transferred through the auxiliary combustor to the gas turbine such that only a portion of the volatiles of the thirty percent (30%) volatile coal need be gasified to supply the gas turbine engine with sufficient heating value to maintain a turbine inlet temperature of one thousand degrees Centigrade (1000° C.) and to operate at the point of peak overall efficiency, point C. Whether twenty percent (20%) volatile matter coal is used or thirty percent (30%) volatile matter coal is used for a turbine inlet temperature of approximately one thousand degrees Centigrade (1000° C.), the maximum overall efficiency of the combined cycle occurs when approximately fifty percent (50%) to eighty percent (80%) of the total fuel used in a combined cycle is employed in the gas turbine engine.

FIG. 6 is a graphical representation of the overall efficiency of the combined cycle shown in FIG. 1 and is similar to the graphical representation of FIG. 5. In FIG. 6 the amount of heating value of fuel sent to the gas turbine engine via the gas from the partial gasifier and via the char to the auxiliary combustor is enough to maintain a turbine inlet temperature of approximately eleven hundred and fifty degrees Centigrade (1150° C.). As with FIG. 5, at every point along the horizontal axis of FIG. 6, that amount of fuel is constant but that amount of fuel decreases as a percentage of the total amount of fuel used in the combined cycle as additional fuel is consumed in the auxiliary combustor to supplementary fire the steam turbine cycle and to provide heat to the partial gasifier. Point A on FIG. 6 marks the operating point where, the coal containing twenty percent (20%) volatile matter, all the volatile matter in the coal has been gasified and an additional portion of coal not containing the volatile matter must be gasified to provide an amount of gas flowing to the gas turbine engine consistent with the turbine inlet temperature of eleven hundred and fifty degrees Centigrade (1150° C.) and consistent with a maximum temperature of eight hundred degrees Centigrade (800° C.) in the heat exchanger of the auxiliary combustor. Point B on FIG. 6 marks the operating point where for coal containing thirty percent (30%) volatile matter, all the volatile matter in the coal is gasified. Enough heating value of the coal is transferred through the auxiliary combustor to the gas turbine engine so that all the volatile matter in the thirty percent (30%) volatile coal is gasified to supply the gas turbine engine with sufficient heating value to maintain a turbine inlet temperature of eleven hundred and fifty degrees Centigrade (1150° C.) and to operate at the point of peak overall efficiency, point B. The difference in efficiency between the twenty percent (20%) volatile matter coal and the thirty percent (30%) matter coal is a reflection of the increase in the efficiency of the partial gasifier resulting from decreasing the mass flows through the partial gasifier. Nevertheless, whether twenty percent (20%) volatile matter coal is used or thirty percent (30%) volatile matter coal is used, for a turbine inlet temperature of approximately eleven hundred and fifty degrees Centigrade (1150°C.), the maximum overall efficiency of the combined cycle occurs when approximately fifty percent (50%) to eighty percent (80%) of the total fuel used in the combined cycle is employed in the gas turbine engine. Thus, the consumption of the char in the auxiliary combustor enables the utilization of a portion of the heating value of the char in the gas turbine engine without exposing components of the gas turbine engine to harmful particulates associated with burning coal. In addition, the consumption of char in the auxiliary combustor enables burning an additional portion of the nonvolatile matter in coal in the auxiliary combustor to increase the efficiency of the steam turbine engine cycle and at the same time to increase the efficiency of the partial gasifier.

Although the invention has been shown and described with respect to preferred embodiments thereof, it should be understood by those skilled in the art that various changes and omissions in the form and detail thereof may be made therein without departing from the spirit and scope of the invention.

We claim:

1. A method for producing power from coal in a combined cycle powerplant employing a gas turbine engine formed of a compressor, a combustion chamber, and a turbine connected to a power output device, employing a steam turbine engine including a boiler and a steam turbine connected to a power output device and employing an auxiliary combustor, comprising the steps of:

feeding coal into a partial gasifier;

converting the coal into combustible fluids and combustible char in the partial gasifier such that the amount of char produced has a heating value less than the heating value of the coal fed into the partial gasifier;

burning the char from the partial gasifier in an auxiliary combustor to produce a high temperature gas containing essentially all of the heating value of all of the char formed in the partial gasifier;

transferring a first portion of the heat from the high temperature gas of the auxiliary combustor to the working medium gas of the gas turbine engine to raise the temperature of the working medium gas;

transferring a second portion of the heat from the high temperature gas of the auxiliary combustor to the working medium fluid of the steam turbine engine to raise steam;

transferring a third portion of the heat from the high temperature gas of the auxiliary combustor to the partial gasifier for converting the coal into combustible char and combustible fluids;

burning the combustible fluid with the working medium gas of the gas turbine engine in the combustion chamber of the gas turbine engine to produce a high temperature working medium gas;

expanding the working medium gases through the turbine of the gas turbine engine to power the gas turbine engine;

exhausting the working medium gas expanded through the turbine into the auxiliary combustor to provide heat and oxygen to the auxiliary combustor; and expanding the working medium fluid through the turbine of the steam engine to power the steam turbine engine.

2. The method for producing power from coal in a combined cycle of claim 1 including the step of storing a portion of the combustible fluids produced by the coal conversion unit.

3. The method for producing power from coal in a combined cycle of claim 1 wherein the auxiliary combustor has a means for fluidizing the char and limestone consumed therein including an aperture plate at the bottom of the combustor across which the exhaust gases of the turbine are flowed to suspend char and limestone particles above the plate.

4. The method for producing power from coal of claim 1, claim 2 or claim 3 in a combined cycle wherein the amount of heating value directed to the gas turbine engine lies in a range of fifty percent to eighty percent of the heating value of the coal fed into the partial gasifier and wherein the turbine inlet temperature of the gas turbine engine is above 1000° C.

* * * * *